United States Patent
Suzuki et al.

[11] 3,837,726
[45] Sept. 24, 1974

[54] CAMERA FOR MAKING HOLOGRAMS

[75] Inventors: Masane Suzuki; Motonori Kanaya; Kazuhisa Seki, all of Omiya, Japan

[73] Assignee: Fiji Photo Optical Co., Ltd., Uetake-cho, Omiya-shi, Japan

[22] Filed: Nov. 5, 1973

[21] Appl. No.: 412,889

[30] Foreign Application Priority Data
Jan. 20, 1973 Japan................. 48-9026

[52] U.S. Cl............... 350/3.5, 354/162, 356/106 R
[51] Int. Cl. .................... G03c 7/00, G03b 27/10
[58] Field of Search.............. 354/162; 350/3.5; 356/106 R, 109, 113

[56] References Cited
UNITED STATES PATENTS
| | | | |
|---|---|---|---|
| 2,571,937 | 10/1951 | Peck | 356/106 R |
| 3,200,727 | 8/1965 | Barton | 354/162 |
| 3,331,300 | 7/1967 | Froehlich | 354/162 |
| 3,755,677 | 8/1973 | Ooue | 350/3.5 |

*Primary Examiner*—Harold A. Dixon

[57] ABSTRACT

A camera for making a hologram is provided with a device for varying the optical path length of the object light or the reference light. The camera includes a range finder to measure the distance from the camera to the object to be recorded on the hologram. The range finder has a rotatable mirror which is rotated to determine the distance. The rotatable mirror is associated with the device for varying the optical path length of the object light or the reference light so that the optical path length of the light may be varied according to the distance of the object to be recorded on the hologram. Both the object light and the reference light may be provided with the optical path length varying device so that the optical path length of one of the lights may be shortened and that of the other may be lengthened.

9 Claims, 2 Drawing Figures

PATENTED SEP 24 1974  3,837,726

CAMERA FOR MAKING HOLOGRAMS

BACKGROUND OF THE INVENTION

1. Field of the Invention

This invention relates to a camera for making holograms, and more particularly to a camera for making holograms of objects located outside the camera body. The term "holography camera" or "camera" herein referred to means an optical system for making a hologram on a photographic emulsion surface by use of coherent light.

2. Description of the Prior Art

In the conventional holography camera, the optical elements constituting the optical system for making the hologram are generally all fixed in the camera so that the adjustment thereof is unnecessary. Therefore, the distance of the object from the film surface is limited in a predetermined range. In the normally used holography camera, therefore, the object to be recorded on the hologram is generally placed in the camera body.

In the above-described conventional holography camera, it has been impossible to make a hologram of an object having a size and shape which prevent it from being put into the camera body. Further, it has been impossible to make a hologram of an object which is remote from the camera body. Therefore, it has been impossible by the conventional holography camera described above to make a hologram of an object which cannot be moved.

SUMMARY OF THE INVENTION

In light of the above described defects inherent in the conventional holography camera, the primary object of the present invention is to provide a holography camera capable of making a hologram of an object which is remote from the camera body.

Another object of the present invention is to provide a holography camera which is able to make a hologram of an object located at any position outside or inside the camera body.

Still another object of the present invention is to provide a holography camera which is conveniently portable.

A further object of the present invention is to provide a holography camera wherein the coherent range within which the object can be placed to be recorded on the hologram can be moved further from or nearer to the camera body.

The above objects of the present invention are accomplished by providing an optical path length varying means in the reference light path and/or the object light path of the holography camera. The optical path length varying means is operated in association with a range finder including a rotatable mirror which is rotated to determine the distance of the object from the camera. Thus, the optical path length of the reference light or the object light is varied according to the distance of the object from the surface of the film on which the hologram is to be recorded so that the optical path length of the reference light and that of the object light may be made equal to each other. Therefore, in accordance with the present invention the coherent range of the reference light is overlapped with the coherent range of the object light wherever the object may be, and accordingly, the hologram of the object can be made even if the object is located outside the camera body.

Therefore, it becomes possible in accordance with the present invention to make a hologram of an object which cannot be moved or put into the camera body.

DESCRIPTION OF THE PREFERRED EMBODIMENTS

Figure 1:
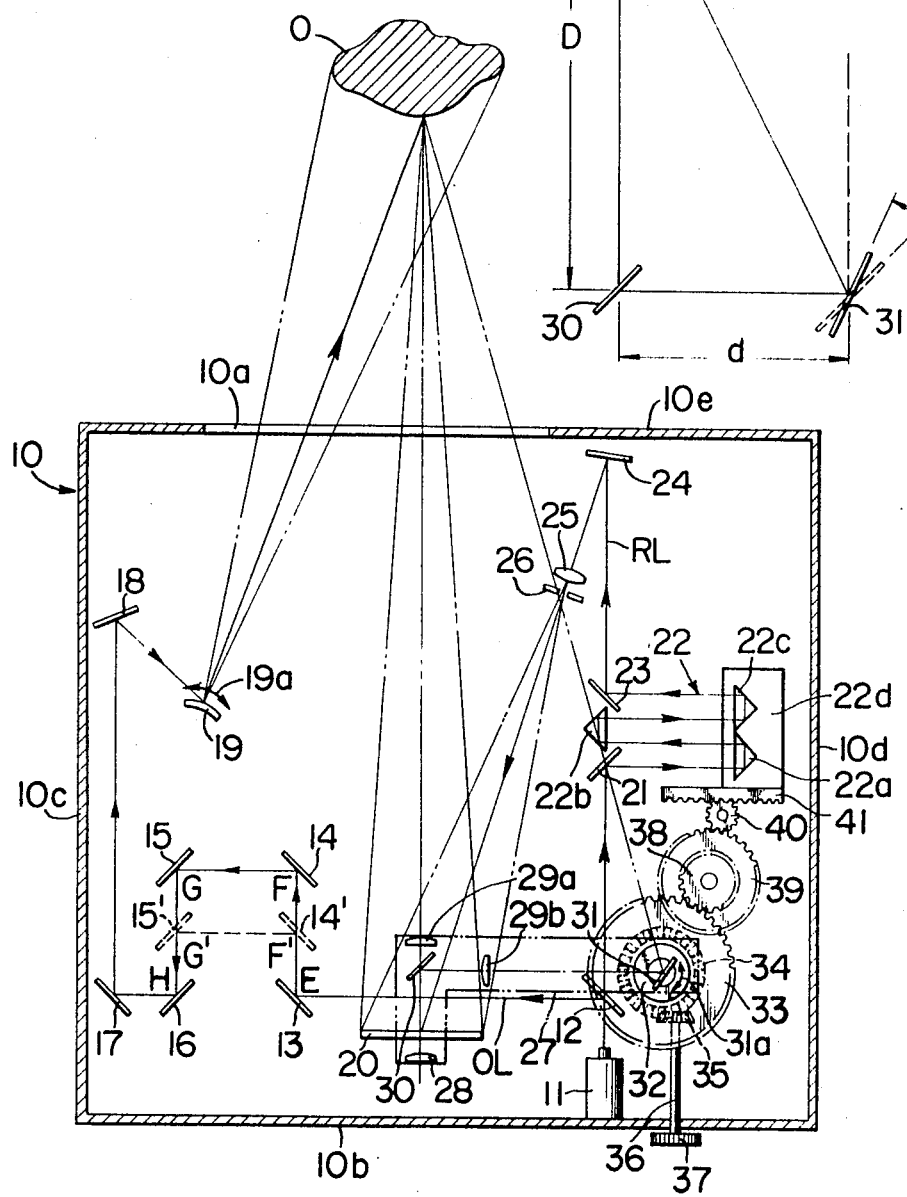
FIG. 1 is a schematic plan view showing the construction of the holography camera in accordance with an embodiment of the present invention.

Referring first to FIG. 1, the holography camera in accordance with the present invention comprises a camera housing 10 with an opening 10a which is to be directed toward the object to be recorded on the hologram and an optical system provided therein. Some part of the optical system is associated with a mechanism to move the part of the system manually.

A laser beam source 11 is installed in the camera housing 10 close to the back wall 10b thereof. A beam splitter 12 is provided in front of the laser beam source 11 to split the beam into object light OL and reference light RL. The term "object light" herein referred to means both the light illuminating the object to be recorded on the hologram and the light reflected by the object and directed to the film. In the embodiment shown in the drawing, the light reflected by the beam splitter 12 serves as the object light OL and the beam transmitting through the beam splitter 12 serves as the reference light RL. In the optical path of the object light OL reflected from the beam splitter 12 is provided a fixed mirror 13 which reflects the object light at a right angle toward a movable mirror 14 which in turn reflects the light at a right angle in the opposite direction toward another movable mirror 15. The second movable mirror 15 reflects the light at a right angle in the same direction as that of the first movable mirror toward a fixed mirror 16 which in turn reflects the light at a right angle in the opposite direction toward still another fixed mirror 17 provided close to a corner of the camera housing 10. Said fixed mirrors 13 and 16 and said movable mirrors 14 and 15 together constitute an angled U-shaped by-pass path EFGH. By together moving both said movable mirrors 14 and 15 further from and nearer to said fixed mirrors 13 and 16, the optical path length of the by-pass optical path EFGH can be varied. In FIG. 1, the imaginary positions of the movable mirrors 14 and 15 which are imaginarily moved closer to the fixed mirrors 13 and 16 are indicated at reference numerals 14i and 15i. The by-pass optical path EFGH is changed to EF'G'H when the movable mirrors 14 and 15 are moved to the imaginary positions 14i and 15i. Said fixed mirror 17 reflects the object light forward along the side wall 10c of the camera housing 10. In the optical path of the light reflected from the fixed mirror 17 is provided another fixed mirror 18 which reflects the light at an acute angle toward a convex mirror 19 which reflects the light toward an object O through said opening 10a. The convex mirror 19 is movable as indicated by an arrow 19a to vary the direction of reflection so that the reflected light may always be directed to the object O. The light reflected by the object O comes into the camera housing 10 through the opening 10a. In the housing 10 close to the back wall 10b thereof is located a photographic film 20 bearing a photosensitive emulsion layer to record a hologram thereon so as to receive the light reflected from the object O.

On the other hand, in the optical path of the reference light RL transmitting through the beam splitter 12 is provided an optical path varying means 22 similar to said movable mirrors 14 and 15. A fixed mirror 21 similar to said fixed mirror 13 is provided in the optical path of the reference light RL passing through the beam splitter 12. The fixed mirror 21 reflects the light at a right angle toward the side wall 10a of the camera housing 10. The light reflected by the fixed mirror 21 is reflected back and forth several times by said optical path varying means 22, which will be described in detail hereinafter, and then reflected by another fixed mirror 23 which is located in the optical path of the light finally reflected by the path length varying means 22. The fixed mirror 23 reflects the light from the path length varying means 22 forward at a right angle. A fixed mirror 24 is provided in the camera housing 10 close to the front wall 10e thereof to reflect backward the light reflected from said fixed mirror 23. The light reflected from the fixed mirror 24 is directed toward said photographic film 20 to record the hologram thereon. In the optical path of the light from the last fixed mirror 24 to the photographic film 20 is provided an optical diverging system comprised of, for example, a lens 25 and a stop 26. Through the lens 25 and the stop 26, the light reflected from the fixed mirror 24 is diverged and directed onto the photographic film 20 where it interferes with the object light reflected from the object O to make a hologram.

In the construction of the optical system employed in accordance with the present invention as described above, the differences from the conventional holography camera lie in the provision of said optical path length varying means 22, the movable mirrors 14 and 15 working as an optical path length varying means and the movable diverging convex mirror 19 used to illuminate the object.

Said optical path length varying means 22 comprises two movable totally reflecting Porro prisms 22a and 22c arranged in parallel and mounted to a movable stage 22d, and a stationary totally reflecting Porro prism 22b provided between said fixed mirrors 21 and 23 and opposite to said movable Porro prisms 22a and 22c. The Porro prisms 22a, 22b and 22c are so located that the light reflected by the fixed mirror 21 is reflected by the first prism 22a and directed toward the second stationary prism 22b, reflected by the second prism 22b and directed toward the third prism 22c and reflected by the third prism 22c and directed toward the fixed mirror 23. The two movable prisms 22a and 22c can be moved further from or nearer to the stationary prism 22b so that the optical path length of the reference light may be varied by moving the prisms 22a and 22c.

The movable stage 22d to which said movable Porro prisms 22a and 22c are mounted is operably associated with a range finder including a rotatable mirror which is rotated to determine the distance of the object from the film. The range finder comprises a range finder casing 27 of L-shape, an eyepiece 28 mounted at an end of the casing 27, a lens system 29a and 29b provided in the casing 27, a half-transparent mirror 30 provided in the casing 27 between said eyepiece 28 and one lens system 29a, and a rotatable reflecting mirror 31 provided at the other end of the casing 27. The other lens system 29b is provided between the half-transparent mirror 30 and the rotatable mirror 31. These optical elements 28 to 31 constitute a conventionally known type of range finder system and the rotatable mirror 31 is rotated as indicated by an arrow 31a to determine the distance of the object O from the film 20 in the camera body. The distance is determined by measuring the field angle made between the optical path from the object O to the half-mirror 30 and the optical path from the object O to the rotatable mirror 31, by overlapping the image directly coming through the half-transparent mirror 30 with the image coming by way of the mirror 31.

The rotatable mirror 31 is mounted on a turntable 32 with the reflecting point of the rotatable mirror 31 positioned on the axis of rotation of the turntable 32. The turntable 32 is coaxially mounted to a spur gear 33 to which a bevel gear 34 is coaxially fixed. The bevel gear 34 is meshed with a bevel gear 35 which is mounted to an end of a rod 36 which has at the other end thereof a knob 37. The knob 37 is exposed on the back wall 10b of the camera housing 10 so that the knob 37 may be manually rotated from outside. Thus, it is possible to rotate the turntable 32 manually from outside by turning the knob 37. Said spur gear 33 is engaged with a small spur gear 38 which is coaxially fixed to a spur gear 39. The spur gear 39 is engaged with a pinion 40 which in turn is engaged with a rack 41 on which said movable stage 22d carrying said movable Porro prisms 22a and 22c is mounted. Therefore, the rotation of said turntable 32 is transmitted to the pinion 40, and accordingly, the rack 41 is moved back and forth by rotating the turntable 32. Thus, said Porro prisms 22a and 22c are moved back and forth to vary the optical path length of the reference light RL by rotating the turntable 32.

In the above described construction, when the rotatable mirror 31 of the range finder is rotated to determine the distance of an object to be recorded on the hologram by turning said knob 37, the Porro prisms 22a and 22c of the optical path length varying means 22 are moved back and forth to vary the optical path length of the reference light RL. Thus, the optical path length of the reference light RL is controlled in accordance with the distance of the object from the film in the camera. The purpose of controlling the optical path length of the reference light RL in accordance with the distance of the object from the film is to make the optical path length of the reference light RL equal to that of the object light OL. The quantitative relation between the angle of the rotatable mirror 31 and the variation in distance of the object from the film and the optical path length varied will now be described in detail with reference to FIGS. 1 and 2.

It will be understood from the description of the detailed construction of the holography camera of this invention that the object light path length can be varied by 2L in length by moving said movable mirrors by L in distance, and that the reference light path length can be varied by 4L in length by moving the Porro prisms 22a and 22c by L in distance. Where the number of the movable Porro prisms in $n$, the variable length of the reference light RL is $2n$L, L being the distance of Porro movement of the prisms. In making a hologram of an object, it is desirable that the optical path length of the reference light RL be equal to that of the object light OL in order to obtain the coherent range of the maximum length. This is because the coherent range in which the object to be recorded can be placed for making a hologram is determined by the overlapping length of the coherent length of the reference light and the object light. When the coherent length of the reference light is completely overlapped with the coherent length of the object light in the sense of the phase thereof, the length of the coherent range becomes equal to a half of the coherent length of the light. In this invention, the coherent range is controlled to be equal to the half of the coherent length of the light.

Now, if the object moves by the length L, the optical path length of the object light OL varies by the length of about 2L. In such a case, the reference light optical path length is to be varied by the length 2L. In order to vary the optical path length of the reference light by the length 2L in the optical system as shown in FIG. 1, the movable Porro prisms 22a and 22c are moved by the length L/2. In case that the number of the movable Porro prisms is $n$, the prisms are moved by the length of L/$n$. It will be understood that the optical path length of the object light OL may be varied instead of that of the reference light by use of said movable mirrors 14 and 15 in the object light path. In this case, the movable mirrors 14 and 15 are moved by the length of L.

Figure 2:
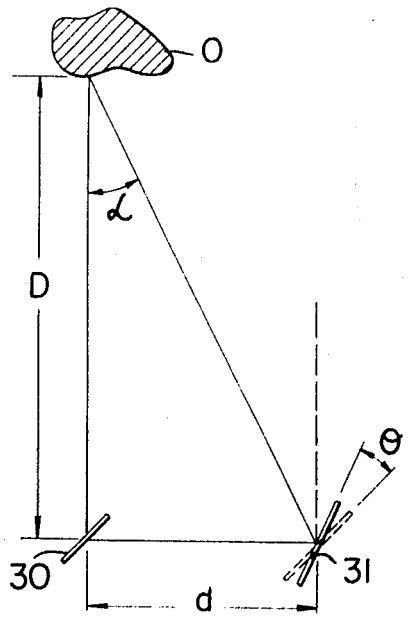
FIG. 2 is a schematic explanatory diagram showing the relationship between the object and the optical elements of the range finder employed in the holography camera in accordance with the present invention.

In order to move the Porro prisms 22a and 22c in accordance with the variation in distance of the object from the film, the prisms are moved back and forth in proportion to the rotation of the mirror 31. The linear relationship between the movement of the Porro prisms 22a and 22c and the rotation of the mirror 31 is explained as follows. With reference to FIG. 2, there is a relation of $$\theta = d/2D$$

between the angle of rotation $\theta$ of the rotatable mirror 31 and the distance D of the object O from the film 20 where the distance between the half-transparent mirror 30 and the mirror 31 is $d$. This is because there is a relation of $$D = d/\tan\alpha \approx d/\sin\alpha = d/\sin 2\theta \approx d/2\theta$$

where $\alpha$ is the angle between the beam from the object to the mirror 31 and the beam from the object to the mirror 30, that is the field angle of the object. Therefore, the distance L between the object and the film is in proportion to the angle of rotation $\theta$ of the rotatable mirror 31.

Therefore, there is a linear relation between the rotation of the mirror 31 and the required movement of the Porro prisms 22a and 22c to make the optical path length of the reference light equal to that of the object light.

In the above described embodiment of this invention, the optical path length of the reference light is varied in accordance with the variation in distance of the object to be recorded on the hologram. It will be understood, however, that the optical path length of the object light may be varied in order to make the optical path length thereof equal to that of the reference light by employing in the object light path an optical path length varying means like said means 22.

Further, it will be understood that both the reference light path and the object light path may be provided with the optical path length varying means to lengthen one of the paths and shorten the other as the distance of an object varies. In this case, the distance of movement of the movable prisms can be shortened in comparison with the embodiment described hereinbefore in which only one of the paths is provided with the path length varying means. It will also be understood that the range finder system may be of any type if it includes a means which rotates or moves back and forth according to variation in distance of the object.

What is claimed is:

1. A camera for making a hologram comprising a camera housing having an opening, a coherent light source provided in the housing, a beam splitter provided in front of the light source for dividing the light from the source into reference light and object light, a first optical system for guiding the object light toward an object located outside said housing through said opening, a second optical system for guiding the reference light toward a photographic film located in the housing to record a hologram thereon, said photographic film receiving light reflected by said object and coming into the housing through said opening to record thereon a hologram of said object, an optical path length varying means provided in the optical path of at least one of said reference light and said object light, a range finder provided in the housing including a movable optical element which is moved to determine the distance of said object from the film, and means for associating said optical path length varying means with said movable optical element in the range finder so that the optical path length varying means may be operated in association with the movement of said movable optical element.

2. A camera for making a hologram as defined in claim 1 wherein said optical path length varying means is provided in the optical path of the reference light.

3. A camera for making a hologram as defined in claim 1 wherein said optical path length varying means is provided in the optical path of the object light.

4. A holography camera as defined in claim 1 wherein both the reference light path and the object light path are provided with the optical path length varying means, the two optical path length varying means are operated in the opposite directions respectively, whereby one of the light path is lengthened while the other optical path is shortened in association with the movement of said movable optical element.

5. A holography camera as defined in claim 1 wherein said optical path length varying means is associated with a manually operable mechanism for moving said movable optical element of the range finder.

6. A holography camera as defined in claim 5 wherein said manually operable mechanism comprises a knob provided on the wall of the camera housing, a gear mechanism associated with the knob to transmit the rotation of the knob to said movable optical element and said optical path length varying means.

7. A holography camera as defined in claim 5 wherein said movable optical element is a rotatable mirror for determining the field angle of the object to measure the distance of the object from the photographic film.

8. A holography camera as defined in claim 5 wherein said optical path length varying means comprises a movable stage associated with said manually operable mechanism and at least one totally reflecting Porro prism mounted on said movable stage for reflecting the light reflected by a stationary mirror provided in the light path back to the path, said Porro prism being movable in the direction of the light reflected by said stationary mirror.

9. A holography camera as defined in claim 8 wherein said movable stage is mechanically associated with a gear train which includes a gear operatively fixed to said optical element, and said gear is manually operable from outside said camera housing.

* * * * *